7055X
H. Bartlett,
Cook Stove.
Patented May 12. 1832.
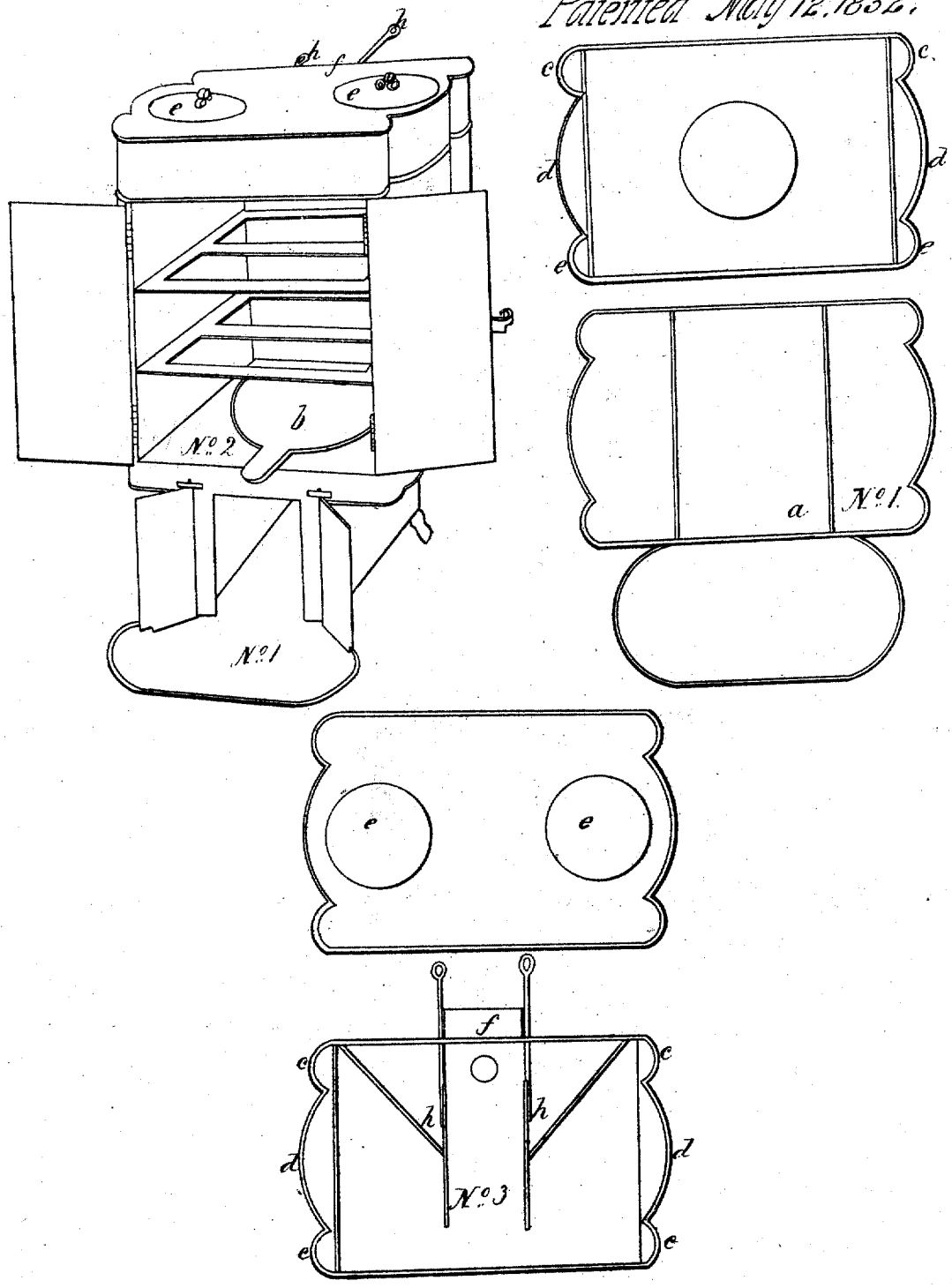

7053X May 12. 1832 No 13 315

Horace Bartlett. Bridgeport. Connecticut.

Letters Patent.

The Schedule referred to in these Letters Patent and
making part of the same, containing a description in the words
of the said Horace Bartlett. himself of his improvement in
the construction of A Cooking Stove.

---

Be it known that I Horace Bartlett, of Bridgeport in the
County of Fairfield, and State of Connecticut have invented
a new and useful improvement in the form and construction
of a Cooking Stove & that the following is a full and exact description
of the construction & operation of the said Cooking Stove as inven-
ted or improved by me. The bed for the fire lies across the stove
from front to rear See plate No 1 letter a. — A plate forming the
remaining part of the bottom turning in a horizontal form, from the
the top of this bed to the full length of the stove which for the sake of
description I call the wings See plate No 1 — Plate No 2 forms the
bottom of the oven over the bed for the fire or plate No 1. between
these plates the blaze is cramped off forming thereby a more
powerful draft, through this plate over the fire, is a hole with
various sized rims, in which the common iron ware may be
used, See plate No 2 letter b. — at each corner of this plate is a
hole for the smoke, over which stands a pipe, in the form of a
half circle letter C. — These pipes are 18 inches long forming
the height of the oven. — between these pipes connected with
them in a circular form is a piece forming the end of the
stove. Facing these pipes is a piece forming the length of
the oven, leaving an opening in the centre for the smoke
letter d — Upon the top of these pipes, is a plate forming the
top of the oven plate No 3. — Over this is another raised 2 inches
forming what I call the drum plate No 4. through which
at

7033X at each end is a hole for boilers letter e.... from the back part of this drum. extends the pipe letter f. – through the bottom plate of the drum which forms the top of the oven is a hole of 1½ inch diameter with a tube arising above the plate to prevent ashes or soot from falling into the oven letter g. – This conveys the steam into the drum when boiling. – When baking bread the hole is closed by a damper on the underside of the plate. Between these plates. ie the inside of drum are pieces around the boilers, to confine the heat longer there letter h, plate No 3. – The heat passing around in front of the drum; from thence across to the pipe, which causes more heat upon the top of the oven. one part of these pieces around the boilers is made to slide forming the dampers. doors to the oven hang upon the pipes, opening from the centre.

What I claim as new is the construction of the oven so as to bake eight loaves of bread at one time, placing them in two or three layers deep. To accomplish this, I claim as new the use of a sheet of tin which being a nonconductor of heat raised from the bottom of the oven on legs of wire prevent the bottom loaves from burning, whilst heat is thrown suf-ficiently through the oven to bake the whole by changing them once or twice. This sheet ought not to cover the whole bottom of the oven leaving room for heat to arise around its edges. Also the hole in the bottom of the oven, for boiling the oven being 13 inches high prevents interfering when putting in or taking out the baking utensils... Also the tube to convey the steam through the top of the oven into the drum, thus boiling below & baking meat on the slide above... Also the conveying the blaze into small tubes, by which the heat is conveyed off with much greater strength so that notwithstanding the boilers on top are a distance from the fire they are on boil. Also the pieces around the boilers confining the heat a longer [illegible] of the [illegible]

[illegible] [illegible] [illegible]

[illegible]